United States Patent
Fourrey et al.

[11] Patent Number: 5,160,167
[45] Date of Patent: Nov. 3, 1992

[54] SELF-LOCKING STRAP GUIDE FOR A SEAT BELT

[75] Inventors: François Fourrey, Montbeliard; Roel Verhoog, Valentigney, both of France

[73] Assignee: ECIA, France

[21] Appl. No.: 675,007

[22] Filed: Mar. 26, 1991

[30] Foreign Application Priority Data

Mar. 30, 1990 [FR] France ................. 90 04123

[51] Int. Cl.⁵ .................................. B60R 22/36
[52] U.S. Cl. ........................... 280/806; 280/808; 297/483; 297/486
[58] Field of Search ............. 280/801, 806, 808; 297/483, 486

[56] References Cited

U.S. PATENT DOCUMENTS

| | | | |
|---|---|---|---|
| 4,009,510 | 3/1977 | Lindblad | 280/808 |
| 4,306,735 | 12/1981 | Pfeiffer et al. | 280/808 |
| 4,359,237 | 11/1982 | Gavagan et al. | 280/808 |
| 4,547,018 | 10/1985 | Cunningham | 280/808 |
| 4,549,769 | 10/1985 | Pilarski | 280/808 |
| 4,682,791 | 7/1987 | Ernst | 280/806 |

FOREIGN PATENT DOCUMENTS 2414952 10/1975 Fed. Rep. of Germany.
WO85/03676 8/1985 PCT Int'l Appl..

Primary Examiner—Kenneth R. Rice
Attorney, Agent, or Firm—Sughrue, Mion, Zinn Macpeak & Seas

[57] ABSTRACT

A self-locking strap guide (S) has a base (10) with a flange (11) for mounting on the structure or shell (C) and with a support (12) against which the strap (S) can be pressed, a lock (20) with a shoe (21) articulated via an axle (30) on the base (10) in such a way that the strap (S) can pass between the support (12) and shoe (21), and in such a way that this shoe (21) can press the strap (S) against this support (12), and elastic stressing means (40) tending normally to move this shoe (21) and this support (12) apart.

18 Claims, 2 Drawing Sheets

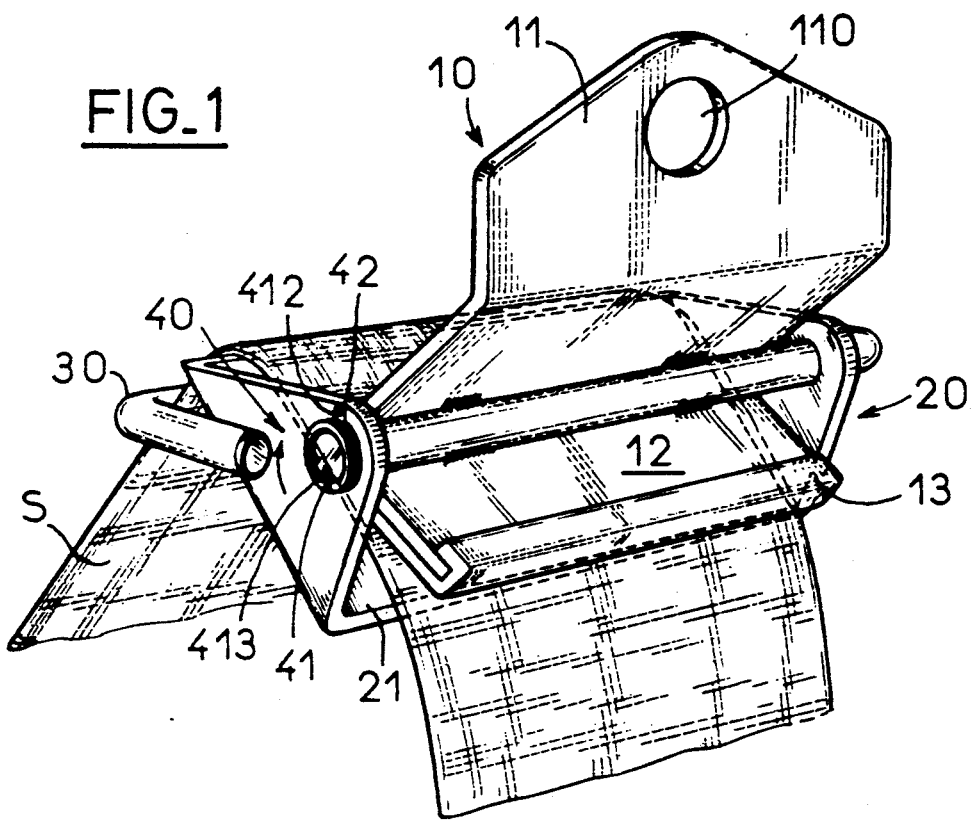
FIG_1
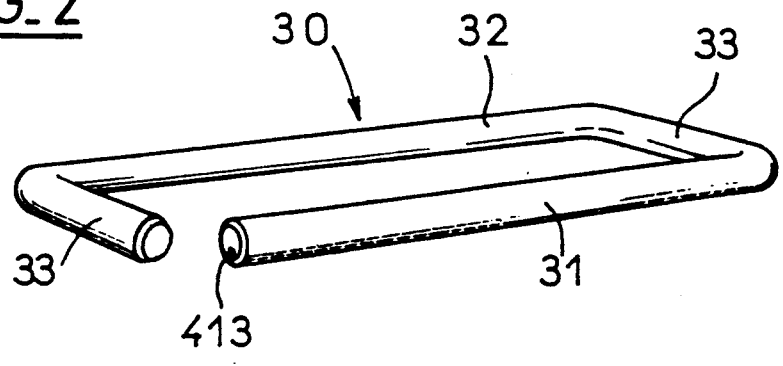
FIG_2

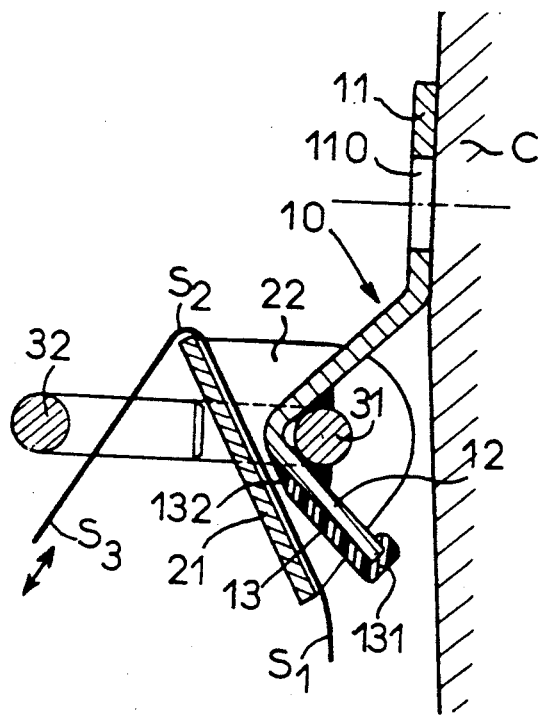
FIG_3
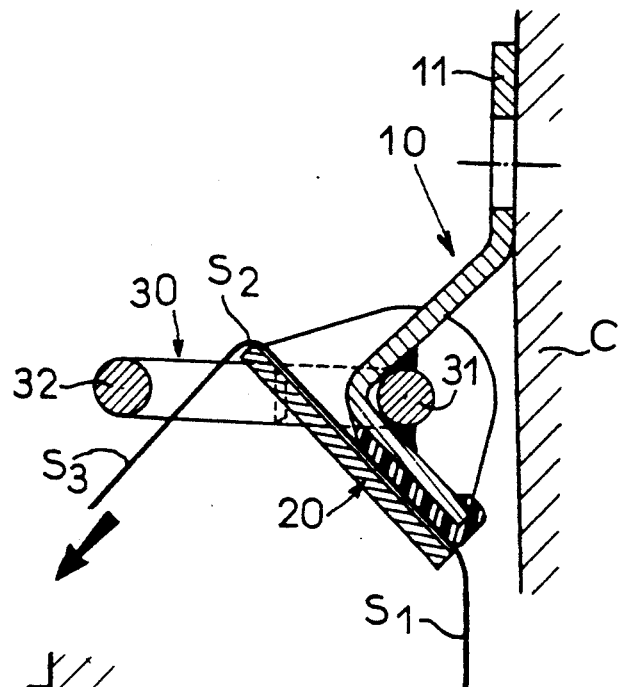
FIG_4
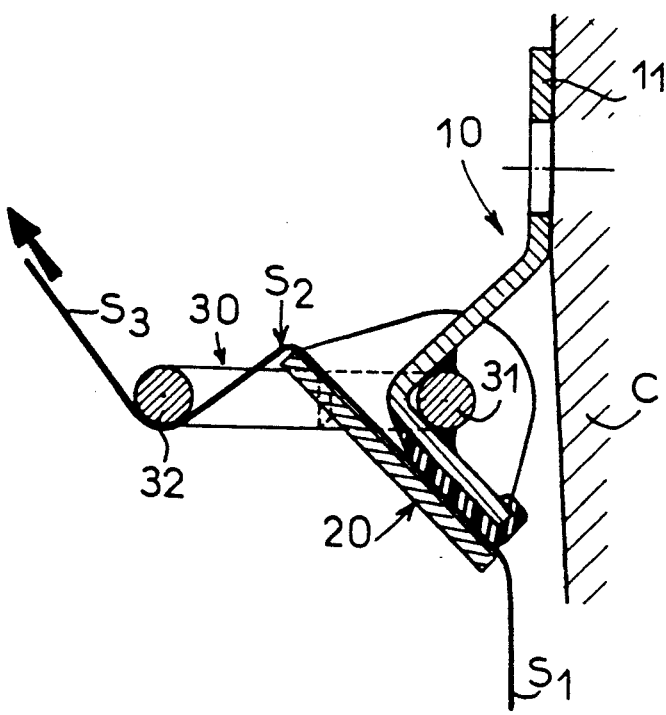
FIG_5

SELF-LOCKING STRAP GUIDE FOR A SEAT BELT

BACKGROUND OF THE INVENTION

The present invention relates to motor vehicle seat belts, and its subject is, particularly, a self-locking strap guide for a seat belt, intended in particular for a land motor vehicle.

As is known, the authorities have enacted regulations which stipulate that vehicles must be equipped with seats provided with seat belts for their occupants. This applies, in particular, to land motor vehicles.

The majority of modern land motor vehicles are provided with a seat belt having three anchorage points and a retractor. Consequently, when such a belt is unreeled and worn by the occupant of a seat, it essentially comprises two working strap portions: a chest portion and a lap portion which remain applied against the occupant by virtue of the tension generated by the retractor. The chest portion extends diagonally, in the manner of a shoulder strap, across the chest of the occupant, whilst the lap portion extends transversely, near waist level. The retractor, in addition to the tension which it exerts in order to hold the strap in contact with its wearer, also makes it possible, when the belt is not being used, to return it to the retracted position so that it does not lie untidily on the seat or on the floor of the vehicle. The retractor is usually provided with an acceleration/deceleration detector which locks it in such a way that the strap cannot be unreeled when it is stressed suddenly by its occupant so that the latter is thus held back, when necessary, in his seat. The length of strap unreeled for a seat belt worn by an occupant of medium build is of the order of two meters or more if there is added to these working portions the operating portion which extends between the retractor, often placed near the floor, and the strap guide situated at shoulder height of a seated occupant.

When a vehicle is subjected to an abrupt deceleration, such as for example that which occurs in the event of a violent impact of longitudinal component, all the kinetic energy of the occupant is absorbed by the seat belt so as to hold him back in his seat and prevent him from being thrown forwards. This kinetic energy absorbed by the seat belt is translated into substantial forces exerted, in particular, on the retractor and on the whole unreeled length of strap, which thus tends to lengthen.

It can thus be understood that, in order to meet the standards currently in force, a retractor must be constructed, and a strap manufactured which are particularly strong and hence expensive.

One of the solutions which has already been proposed consists in providing for only part of the unreeled length of strap, and not all of it, to be used in order to absorb the kinetic energy of the occupant. By not transmitting the forces to the reactor via the operating portion, it is then possible to construct the former less robustly using materials which are lighter and less expensive than the traditional materials.

One of the techniques proposed for the implementation of such a solution consists in using a strap guide, which is situated at the upper extremity of the chest portion, with a catch mechanism. In the event of an abrupt deceleration, this catch mechanism jams the strap in the guide and prevents the forces, absorbed solely by the chest portion and the lap portion, from being transmitted to the remainder of the straps or to the retractor. Embodiments of such a technique are, for example, disclosed in the documents WO 86/00 585 and EP 0 271 183. The proposals described in these documents make use of catch mechanisms which employ wedge-locking mechanisms. These mechanisms include numerous and complex components and are consequently expensive to produce, assemble and mount, and their reliability is also dubious.

SUMMARY OF THE INVENTION

The object of the invention is to construct a self-locking strap guide for a seat belt, which is of a simple design, is easy to produce, assemble and mount and is hence inexpensive whilst at the same time being particularly reliable.

The subject of the invention is a self-locking strap guide for a seat belt, which is intended to be fixed to a vehicle structure or shell and which is characterized in that it comprises a base with a flange for mounting on the structure or shell and with a support against which the strap can be present, a lock with a shoe articulated via an axle on the base in such a way that the strap can pass between the support and shoe, and in such a way that this shoe can press the strap against this support, and elastic stressing means tending normally to move this shoe and this support apart.

Other features of the invention will emerge upon reading the description and the claims which follow, and from examination of the attached drawing, given purely by way of example and in which:

BRIEF DESCRIPTION OF THE DRAWING

FIG. 1 is a perspective view, seen from the rear, of an embodiment of a strap guide according to the invention;

FIG. 2 is a detailed view of a component of the embodiment in FIG. 1; and,

FIGS. 3, 4 and 5 are diagrammatic views, in axial longitudinal section, of the embodiment in FIGS. 1 and 2 shown in three different operating phases.

DESCRIPTION OF A PREFERRED EMBODIMENT

Since vehicle seat belts, in particular for land motor vehicles, are well known, and in particularly strap guides, only what concerns the invention directly or indirectly will be described. For the remainder, the person skilled in the art in question will draw from the current conventional solutions available to him in order to deal with the particular problems with which he is faced.

In the description which follows, a same reference numeral always identifies a similar element, irrespective of the embodiment.

For the sake of the explanation, each of the components of a self-locking strap guide for a seat belt according to the invention will be described in succession before explaining how it operates.

As can be seen in particular in FIGS. 1 and 2, a self-locking strap guide for a seat belt according to the invention comprises, inter alia, a base 10, a lock 20, an axle 30 and elastic stressing means 40.

This strap guide is, for example, intended to equip land motor vehicle and to be mounted against the centre pillar of a structure or shell C, separating the front and rear side-door openings of a four-door vehicle. This guide is intended to be equipped with a strap S.

As can be observed, the base 10 comprises a flange 11 and a support 12. This support 12 consists, for example, of one of the sloping sides of a roof, the other sloping side of which is joined to the flange. As can be seen, this support 12 is inclined relative to this flange 11 in a rising direction, moving away from the flange. The flange 11 is pierced with an eye 110 intended to receive a fixing device for securing the strap guide on the structure or shell C of the vehicle. This fixing device, not shown, is for example a screw, a bolt or a rivet. This support 12 is preferably provided with a pad 13 which has a rim 131 shaped in a U in order to fit over the support 12, and has at the opposite end a bevel 132. The role of this pad, the configuration of which is clearly illustrated in the drawing, will be returned to later.

The lock 20 comprises a shoe 21. This lock 20 preferably has the form of stirrup, the shoe 21 of which serves as a bridge for joining two side cheeks 22. Each of these cheeks is pierced by a hole 210, and at least one of them, in proximity to this hold, is provided with a recess 412 for reasons which will become clear below.

This lock 20 is articulated on the base 10 via an axle 30. This axle preferably has a rectangular configuration, one of the large parallel sides of which constitutes a journal 31 fixed to the base 10 by any appropriate current technique and on which the lock 20 is mounted so as to pivot, and the other large side of which constitutes a bearing piece 32 situated in such a way that the lock 20 is placed between this journal 31 and this bearing piece 32 for reasons which will be understood later. As can be observed, in particular in FIG. 2, the large parallel sides of this rectangle, which is open, which constitute this journal 31 and this bearing piece 32 are jointed by a branch 33. The free extremity of the journal 31 has a face in which a recess 413 is formed for reasons which will be understood later.

The elastic stressing means 40 are, for example, a spiral spring, preferably a length of helical spring, one of the bent-back ends of which, for example the end 41, is anchored to the axle 30 via the recess 413 in which it is engaged, and the other end 42 of which is anchored to the lock 20 via the recess 412 in which it too is engaged. The torque generated by this spring is such that it tends normally to move the shoe 21 and the support 12 apart, as indicated diagrammatically by an arrow in FIG. 1.

All of this appears clearly upon examination of FIGS. 1 and 2 in particular.

The strap S, only part of which is illustrated, is threaded through the strap guide, as shown. The operating portion coming from the retractor passes between the support 12 and the lock 20 and then is bent back in order to pass between the lock 20 and the bearing piece 32 so as to form the chest portion. This illustrated part of the strap can therefore be split up into an upstream potion $S_1$, that part between the retractor (not shown) and the strap guide, an intermediate portion $S_2$, that part which is within the strap guide, and a downstream portion $S_3$, that part which continues the strap thereafter, towards a buckle, not shown.

Reference will now be made to FIGS. 3, 4 and 5 which illustrate the operation of this embodiment of a self-locking strap guide for a seat belt according to the invention.

When an occupant puts on or removes his seat belt, the strap of the latter is displaced at a low speed, as indicated diagrammatically by the double-headed arrow, and the strap guide occupies the position in which it is illustrated in FIG. 3, owing to the action of the torque exerted by the elastic stressing means. It can be observed that, in this position, the pad 13 of the support 12 is spaced apart from the shoe 21, and that the strap S can thus slide freely between them. This sliding is facilitated by the presence of the bevel 132.

If the occupant is thrown violently forwards following an extremely abrupt deceleration, such as that resulting from a frontal impact, a sharp pull is exerted on the downstream belt portion $S_3$, as shown by a thick arrow in FIG. 4. This force generates a substantial torque which opposes that generated by the elastic means, and the lock pivots. This pivoting causes the pad to approach the bearing piece and to grip the upstream portion $S_1$ of the strap firmly, thus immobilising it. It can therefore be observed that no force is transmitted to the retractor by the operating portion, and that only the length of strap unreeled for the working portions, between the self-locking strap guide according to the invention and the anchorage points of the lap portion, is subjected to an extension.

It will be observed that the strap guide according to the invention is also effective in the event of the vehicle overturning following a somersault, as results from examination of FIG. 5 in which the strap guide according to the invention is drawn with a reverse orientation to that which it occupies in such a circumstance. Indeed, in such a case, the downstream portion $S_3$ would rest on the bearing piece 32 and would cause the lock 20 to pivot in the direction indicated previously with regard to FIG. 4 in order to lock the strap firmly.

The base and the lock are preferably manufactured from appropriate pieces of sheet metal punched and shaped using conventional techniques, and the axle is, for example, made from a metal rod made from a material of suitable type and bent three times. In such a case, the rod is fixed to the base by welding, for example, as illustrated diagrammatically in the drawing by a plurality of weld points. The pad is, for example, made from a material which is both flexible, in order to match the shape of the strap well during its clamping, and which also has a high coefficient of relative friction, as compared with the strap, so as to ensure an effective locking; this pad is, for example, made from a synthetic material such as an elastomer.

It is clear that, for example, the base can have a different configuration, for example in a J shape, the rectilinear part of which serves as a flange and the other, preferably flattened, part of which serves as a support. Similarly, instead of being plane, the interacting parts of the support and of the shoe can have complementary curvatures directed appropriately.

All the advantages which a self-locking strap guide for a seat belt according to the invention provides can be understood from the above. As has been made clear, the forces which result from an impact are essentially sustained in particular by the upper anchorage point, in other words the strap guide, and the retractor and its fixing consequently do not need to meet the requirements of such a severe specification. The force exerted on the strap no longer tends to tighten the turns on the coil of the retractor, and the total elongation of the strap of the belt is considerably reduced since the unreeled length subjected to the force is more restricted and is limited just to the chest and lap working portions.

We claim:

1. Self-locking strap guide (S) for a seat belt, said guide being adapted to be fixed to a vehicle structure or shell (C) and comprising:

a base (10) with a flange (11) for mounting on the structure or shell (C), and with a support (12) against which the strap (S) can be pressed;

a lock (20) with a shoe (21) articulated via an axle (30) on the base (10) such that the strap (S) can pass between the support (12) and the shoe (21), and such that the shoe (21) can press the strap (S) against the support (12); and elastic stressing means (40) tending normally to move the shoe (21) and the support (12) apart;

wherein the lock (20) has the form of a stirrup with two parallel cheeks (22) which are placed on either side of the support (12), which receive the axle (30), and which are joined by the shoe (21) forming a bridge; and wherein the axle (30) has a rectangular configuration, one of the long parallel sides of which constitutes a journal (31) fixed to the base (10) and on which the lock (20) is mounted so as to pivot, and the other long side of which constitutes a bearing piece (32) situated in such a way that the lock (20) is placed between the journal (31) and the bearing piece (32).

2. Strap guide according to claim 1, wherein the support (12) is inclined to the flange (11) in a rising direction moving away from the flange.

3. Strap guide according to claim 2, wherein support (12) is a sloping side of a roof, the other sloping side of which is joined to the flange (11).

4. Strap guide according to claim 1, wherein said elastic stressing means (40) comprises a spring, one end (41) of which is anchored to the axle (30), and the other end (42) of which is anchored to the lock (20).

5. Strap guide according to claim 1, wherein the support (12) is provided with a pad (13).

6. Strap guide according to claim 1, wherein the support (12) and the shoe (21) are plane.

7. Strap guide according to claim 1, wherein:

said elastic stressing means (40) comprises a spring, one end (41) of which is anchored to the axle (30), and the other end (42) of which is anchored to the lock (20);

the axle (30) has the configuration of an open rectangle, the long parallel sides of which are joined by a branch (33); and the spring (40) is a spiral spring which is threaded over a free extremity of the journal (31), one (41) of the ends of which is engaged in a recess (413) in a face of said extremity, and the other end (42) of which is engaged in a recess (412) in one of said cheeks (22) of the lock (20).

8. Self-locking strap guide (S) for a seat belt, said guide being adapted to be fixed to a vehicle structure or shell (C) and comprising:

a base (10) with a flange (11) for mounting on the structure or shell (C), and with a support (12) against which the strap (S) can be pressed;

a lock (20) with a shoe (21) articulated via an axle (30) on the base (10) such that the strap (S) can pass between the support (12) and the shoe (21), such that the shoe (21) can press the strap (S) against the support (12); and elastic stressing means (40) tending normally to move the shoe (21) and the support (12) apart;

wherein the support (12) is provided with a pad (13); and wherein the pad (13) has at one end thereof a rim (31) shaped in a U in order to fit over the support (12), and had at an opposite end thereof a bevel (132).

9. Self-locking strap guide for a seat belt, said guide being adapted to be fixed to a vehicle structure of shell and comprising:

a base (10) with a flange (11) for mounting on said structure of shell, and with a non-movable support (12) adapted to be contacted by a strap (S) of said belt;

a lock (20) pivotally mounted on said base (10) by an axle (30) and having a shoe (21) which is unitarily movable with said lock (20), which is located to be facing said non-movable support (12) in order to form therewith a clamping means when moved toward said non-movable support (12), and which has an edge; and biasing means (40) connecting said base (10) and lock (20) and providing an action normally to maintain said support (12) and shoe (21) apart;

wherein said strap (S) is adapted to pass between said support (12) and shoe (21) and on said edge such that said strap (S) is freely movable when said support (12) and shoe (21) are maintained apart, and such that said strap (S) is clamped between said support (12) and said shoe (21) when said strap (S) is formed against said shoe edge to overcome said action of said biasing means (40).

10. Strap guide according to claim 9, wherein the support (12) is inclined relative to the flange (11) in a rising direction moving away from the flange.

11. Strap guide according to claim 10, wherein support (12) is a sloping side of a roof, the other sloping side of which is joined to the flange (11).

12. Strap guide according to claim 9, wherein the lock (20) has the form of a stirrup with two parallel cheeks (22) which are placed on either side of the support (12), which receive the axle (30), and which are joined by the shoe (21) forming a bridge.

13. Strap guide according to claim 12, wherein the axle (30) has a rectangular configuration, one of the long parallel sides of which constitutes a journal (31) fixed to the base (10) and on which the lock (20) is mounted so as to pivot, and the other long side of which constitutes a bearing piece (32) situated in such a way that the lock (20) is placed between the journal (31) and the bearing piece (32).

14. Strap guides according to claim 13, wherein said elastic stressing means (40) comprises a spring, one end (41) of which is anchored to the axle (30), and the other end (42) of which is anchored to the lock (20).

15. Strap guide according to claim 14, wherein the axle (30) has the configuration of an open rectangle, the long parallel sides of which are joined by a branch (33); and wherein the spring (40) is a spiral spring which is threaded over a free extremity of the journal (31), one (41) of the ends of which is engaged in a recess (413) in a face of said extremity, and the other end (42) of which is engaged in a recess (412) in one of said cheeks (22) of the lock (20).

16. Strap guide according to claim 9, wherein the support (12) is provided with a pad (13).

17. Strap guide according to claim 16, wherein the pad (13) has at one end thereof a rim (131) shaped in a U order to fit over the support (12), and has at an opposite thereof a bevel (132).

18. Strap guide according to claim 9, wherein the support (12) and the shoe (21) are plane.

* * * * *